United States Patent
Wagner

Patent Number: 5,497,558
Date of Patent: Mar. 12, 1996

[54] MULTI-FUNCTION DRAFTING INSTRUMENT

[75] Inventor: Michael J. Wagner, Carol Stream, Ill.

[73] Assignee: Sanford Corporation, Bellwood, Ill.

[21] Appl. No.: 379,374

[22] Filed: Jan. 24, 1995

Related U.S. Application Data

[63] Continuation-in-part of Ser. No. 60,382, May 11, 1993, abandoned.

[51] Int. Cl.⁶ ............................ B43L 9/04; G01B 3/04
[52] U.S. Cl. .................... 33/27.03; 33/42; 33/44; 33/476; 33/481
[58] Field of Search ................ 33/27.02, 27.03, 33/27.032, 32.2, 41.1, 42, 44, 26, 411, 435, 437, 474, 476, 481, 490

[56] References Cited

U.S. PATENT DOCUMENTS

| D. 166,905 | 6/1952 | Coates | 33/27.03 |
|---|---|---|---|
| 663,168 | 12/1900 | Hembree | 33/27.03 |
| 799,474 | 9/1905 | Larson et al. | 33/429 |
| 1,266,010 | 5/1918 | Golden | 33/26 |
| 1,266,845 | 5/1918 | Morin | 33/27.03 |
| 1,447,207 | 3/1923 | Golden | 33/26 |
| 2,104,515 | 1/1938 | Golden | 33/27.03 |
| 2,581,839 | 1/1952 | Douglas | 33/430 |
| 3,089,245 | 5/1963 | Cromer et al. | 33/27.03 |
| 3,474,538 | 10/1969 | Kirkegaard | 33/27.03 |
| 3,881,253 | 5/1975 | Haws | 33/1 MP |

FOREIGN PATENT DOCUMENTS

| 377266 | 6/1923 | Germany | 33/433 |

*Primary Examiner*—Thomas B. Will
*Attorney, Agent, or Firm*—Baker & McKenzie

[57] ABSTRACT

A drafting instrument is disclosed that functions as a protractor, compass, T-square and ruler. The instrument is especially adaptable for use on dry erase boards, chalkboards and tables Apertures disposed in the ruler portion of the instrument accommodate pen tips and facilitate the drawing of arcs, circles and parallel lines. The preferred embodiment of the instrument is two-piece with a uni-body instrument and a suction cup pivotally attached to the underside thereof.

13 Claims, 3 Drawing Sheets

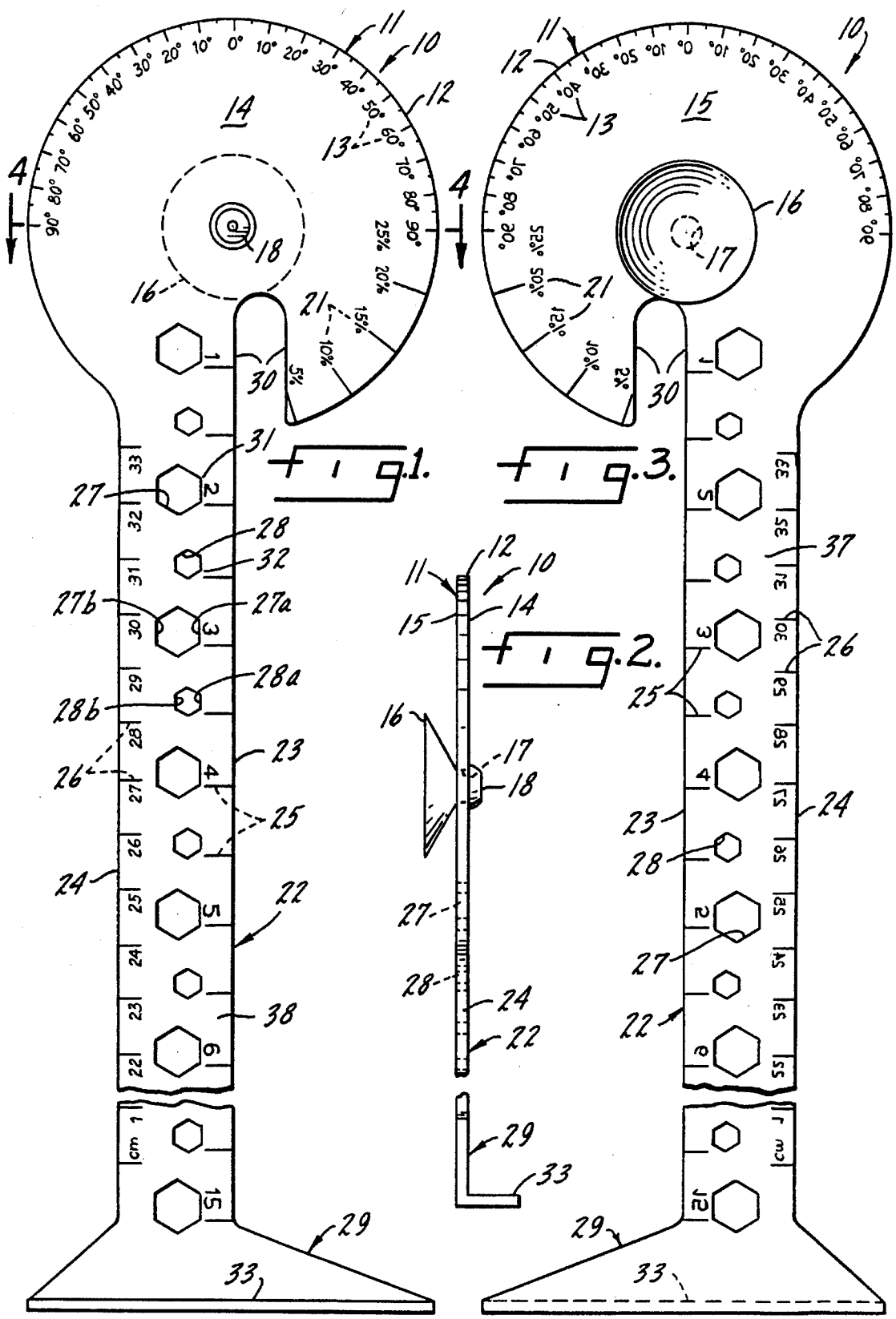

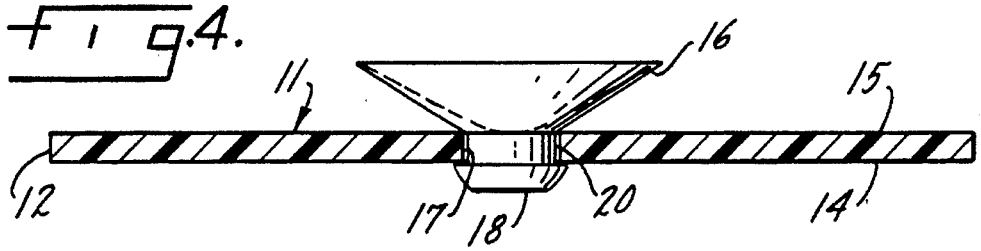
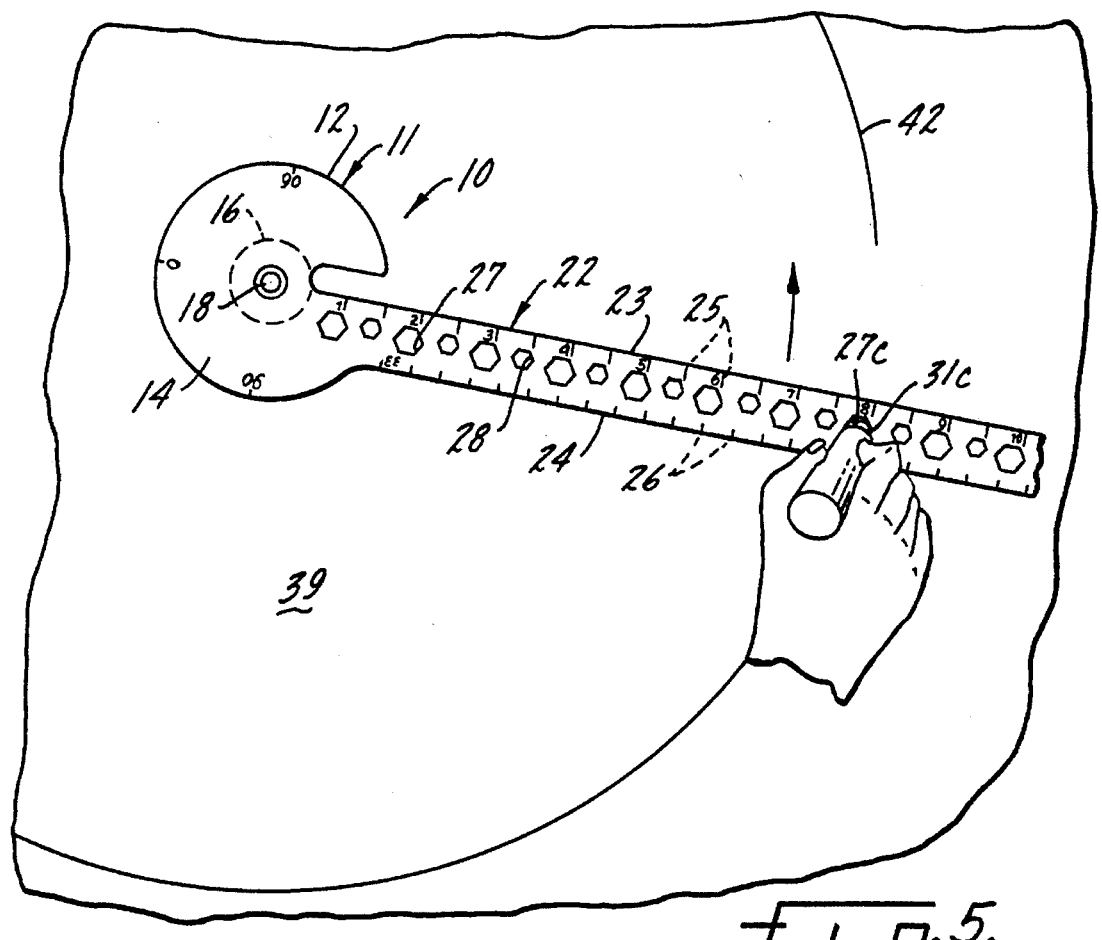
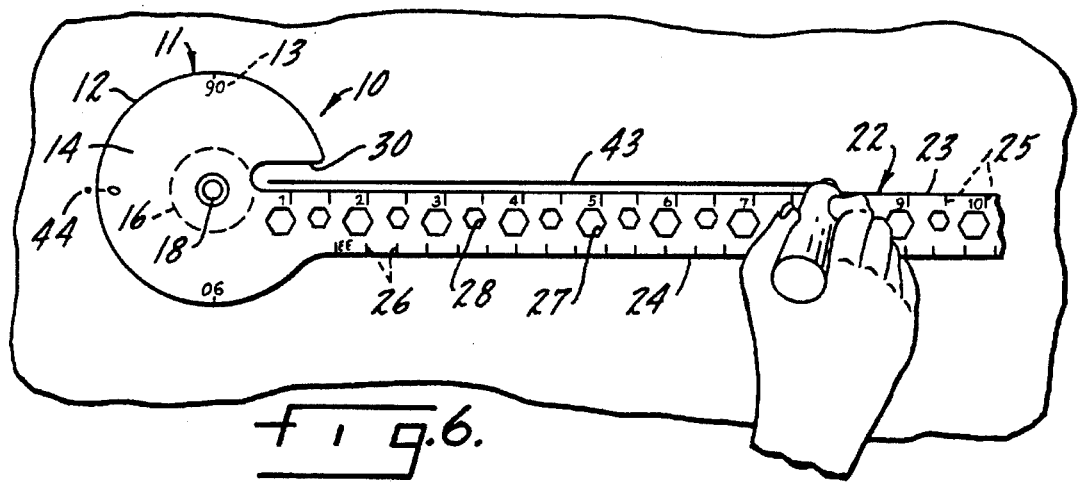

MULTI-FUNCTION DRAFTING INSTRUMENT

This is a continuation-in-part of application Ser. No. 08/060,382, filed May 11, 1993, now abandoned.

FIELD OF THE INVENTION

This invention relates generally to drafting instruments and more specifically to multi-functional drafting instruments. The invention comprises a two-piece drafting instrument that may be removably mounted to a dry erase board that further provides protractor, compass, ruler and T-square functions. The instrument of the present invention may also be used in connection with a drafting table, conventional chalkboard or other surfaces.

BACKGROUND OF THE INVENTION

Drafting instruments such as compasses, protractors, rulers and T-squares are well known. However, the combination of these tools has been fairly limited. Specifically, there is no drafting tool currently available that combines the protractor, T-square, compass and ruler functions in one easy-to-use tool fabricated from as little as two parts. The prior art only taught complicated, multi-component instruments that are expensive to manufacture and difficult to use. Further, there is no currently available drafting tool that combines the protractor, T-square, compass and ruler functions that is also suitable for use on dry erase boards.

Limited combinations of various drafting tools are shown in the prior art. For example, U.S. Pat. No. 3,378,927 discloses a drafting implement which can draw parallel lines on the blackboard and strike arcs about a center located near the edge of a blackboard. However, the device disclosed cannot draw circles, function as a protractor, or mark off distances. Further, the device of U.S. Pat. No. 3,378,927 is fabricated from at least ten different parts.

By contrast, U.S. Pat. No. 1,447,207 discloses a device that can function as a compass to draw a circle, as a protractor and further as a ruler, but the device has no capacity to function as a T-square or draw parallel lines. Despite its limited use, the device shown in U.S. Pat. No. 1,447,207 is fabricated from three separate parts.

U.S. Pat. No. 2,104,515 discloses a T-square for use on blackboards that also includes a protractor of limited value. The device disclosed in U.S. Pat. No. 2,104,515 also includes a complicated means for attaching the device to the blackboard which interferes with its use as a ruler but is fabricated from eight or more separate parts. U.S Pat. No 2,581,839 also discloses a drawing instrument for use on a blackboard. The device operates as a protractor, ruler and compass but not as a T-square. Further, the device shown in U.S. Pat. No. 2,581,839 includes multiple parts (approximately six parts) and therefore is expensive to manufacture.

Thus, there is a need for a simple, yet effective, inexpensive drafting instrument that combines the functions of a protractor, T-square, ruler and compass in one simple, easy-to-use instrument. Further, there is also a need for a drafting instrument for use on dry erase boards and on chalkboards that combines the compass, protractor, T-square and ruler functions in one instrument. Preferably, the instrument should be made from as few pieces as possible to lower the cost of manufacture and the retail price.

SUMMARY OF THE INVENTION

The present invention satisfies the aforenoted needs by providing a two-piece drafting instrument for use on drafting tables and dry erase chalkboards that combines the functions of a compass, protractor, T-square and ruler in one easy-to-use instrument.

A circular plate is provided with a suction cup mounted on the undersurface of the circular plate. The suction cup attaches the instrument to either a drafting table or a dry erase chalkboard. The circular plate is pivotally mounted to the top of the suction cup and therefore can easily rotate once the cup has engaged a surface such as a table or board.

The outer periphery of the circular plate includes measurement indicia indicating angles for use as a protractor. In the preferred embodiment, the circular plate also includes indicia indicating percentages so as to facilitate the drawing of pie charts indicating percentages or allotments.

An arm extends outward from the circular plate that serves as a ruler. One edge of the ruler includes inch or English unit designations and the opposing edge includes centimeter or metric designations. A series of apertures is disposed along the length of the arm or ruler. The apertures accommodate a pen, pencil marker or dry erase marker for drawing circles or arcs. For example, with the suction cup mounted to a board, a pen may be inserted into an aperture disposed along the arm and pivotal movement of the arm and circular plate about the suction cup will result in the drawing of a circle.

The distal end of the arm includes an outwardly protruding lip or ledge that serves as a T-square. Specifically, the ledge may be mounted on top of a board, and a pen may be inserted through an aperture disposed in the ruler. As the ledge and ruler are pulled along the top of the board, a straight horizontal line is drawn across the board. A series of parallel lines may be drawn using different apertures. Vertical lines may be drawn using a pen in the aperture and dragging the ledge up or down a side edge of the board.

To use the instrument as a protractor, a base line is drawn along the upper edge of the arm and a zero degree point is marked on the opposing side of the circular plate. After an angle is selected, the arm and circular plate are rotated until the selected angle lines up with the zero point. Then the angled line may be drawn along the upper edge of the arm.

Thus, an improved drafting instrument is provided that combines the functions of a compass, protractor, T-square and ruler in one instrument that may be used on a drafting table, chalkboard or dry erase board.

It is therefore an object of the present invention to provide a drafting instrument that combines the functions of a compass, protractor, T-square and ruler in a two-piece instrument that is easy to use and inexpensive to manufacture.

It is an object of the present invention to provide an improved multi-function drafting instrument that is less expensive to manufacture than the multi-function drafting instruments taught in the prior art.

It is also an object of the present invention to provide an improved drafting instrument for use on chalkboards, dry erase boards and drafting tables.

Other features and advantages of the invention will appear from the following description in which one embodiment has been set forth in detail in conjunction with the accompanying drawings.

BRIEF DESCRIPTION OF THE DRAWINGS

This invention is illustrated more or less diagrammatically in the accompanying drawing, wherein:

FIG. 1 is a top plan view of a drafting instrument made in accordance with the present invention;

FIG. 2 is a partial side view of the drawing instrument shown in FIG. 1;

FIG. 3 is a bottom plan view of the drafting instrument shown in FIG. 1;

FIG. 4 is a sectional view taken substantially along line 4—4 as shown in FIG. 1;

FIG. 5 is a partial top view of the instrument shown in FIG. 1 particularly illustrating the compass function;

FIG. 6 is a partial top plan view of the instrument shown in FIG. 1 particularly illustrating the ruler function;

DETAILED DESCRIPTION OF THE INVENTION

Figure 7:
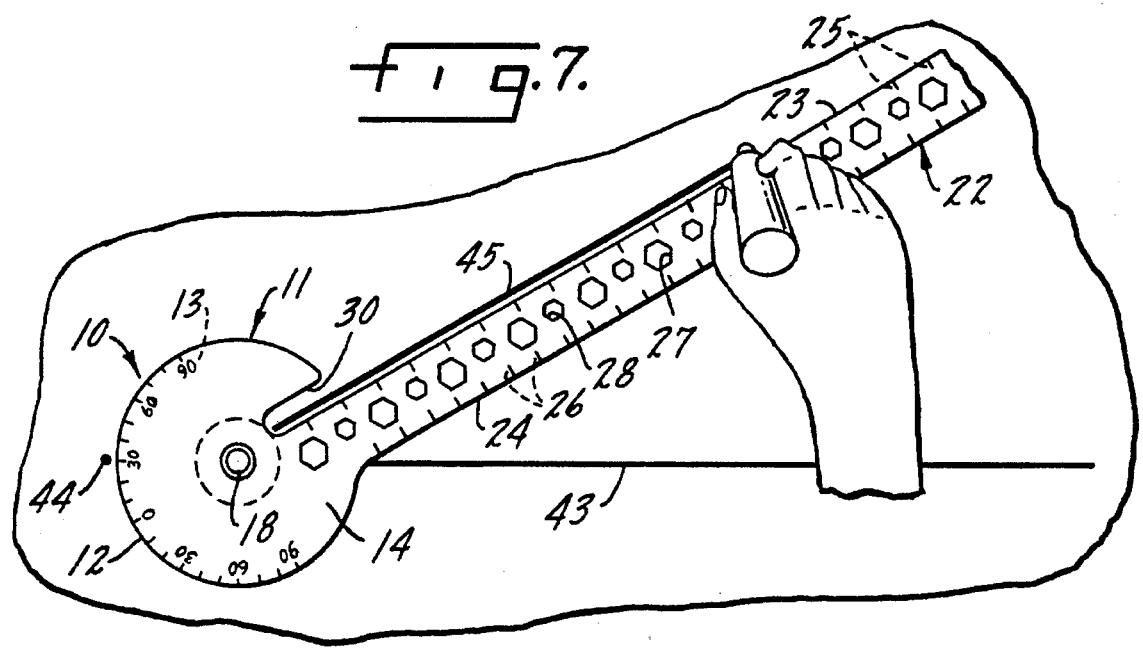
FIG. 7 is a partial top plan view of the instrument shown in FIG. 1 particularly illustrating the protractor function.

Like reference numerals will be used to refer to like or similar parts from Figure to Figure in the following description of the drawing.

The dramatic improvement contributed by the present invention is best understood after consideration of the prior art. Specifically, no prior art reference combines compass, protractor, ruler and T-square functions in one uni-body instrument that may be used on a drafting table, chalkboard, dry erase board or other drawing surface. Specifically, no multi-functional drafting instrument is currently available that is especially adapted to be used with dry erase chalkboards. Finally, all of the prior art directed to multi-functional drafting instruments is complicated, requires numerous parts and therefore must sell at a substantially higher cost than the devices taught by the present invention which may be manufactured from as little as two pieces.

Turning to FIG. 1, the drafting instrument 10 includes a circular plate 11 with an outer periphery 12. The outer periphery 12 carries a plurality of indicia 13 which indicate degrees or angles when the circular plate 11 is used as a protractor. The circular plate 11 includes an upper surface 14 and an undersurface indicated at 15 in FIG. 3. In the preferred embodiment, the indicia 13 are disposed on the undersurface 15 of the circular plate 11 and the material used to mold the tool 11 is translucent enabling the user to see the indicia 13 through the upper surface 14 of the circular plate 11.

A suction cup 16 is disposed underneath the circular plate 11. An aperture 17 disposed in the circular plate 11 accommodates a neck between the plate 11 and a cap 18 leaving the cap 18 disposed above the plate 11 and the suction cup 16 disposed below the plate 11. The suction cup 16 enables the instrument 10 to be mounted to a vertical board or secured to a more horizontal drafting surface. The circular plate 11 is pivotally mounted to the suction cup 16 and therefore the plate 11 and instrument 10 rotate freely about the suction cup 16 when the suction cup 16 is mounted to a surface.

The indicia indicated at 13 are used in the protractor function. The indicia indicated at 21 are used during the drawing of pie charts. For example, 5, 10, 15 and 20 percent segments of a round pie chart may be indicated using the indicia 21.

The arm 22 extends outwardly from the circular plate 11 and functions as a ruler. The arm 22 includes an upper edge 23 and a lower edge 24. The upper edge 23 includes the indicia 25 which indicates inches or English units of measurement. The lower edge 24 includes indicia 26 which indicates centimeters or other metric units. The upper edge 23 of the arm 22 extends inwardly into the circular plate 11 to create a slot indicated at 30. The purpose of the slot 30 is to lengthen the usable length of the upper edge 23 so the lines of an angle, such as one corner of a triangle, may be more easily connected as will be shown below with respect to FIG. 7.

The arm 22 also includes apertures 27, 28 which are of two principal sizes. The apertures 27, 28 accommodate pens, pencils, markers and dry erase markers for use on dry erase boards. A sharper writing instrument may be accommodated in a corner of an aperture 27 or 28 such as those indicated at 31 or 32, respectively. However, it will be noted that dry erase markers and other markers are normally provided in a wide slanted tip. The width of a tip of a smaller-style marker will be snugly accommodated between two parallel walls, such as those illustrated at 28a and 28b, of the smaller apertures 28. The tips of larger markers will be snugly accommodated in the parallel walls, such as those indicated at 27a and 27b. Thus, the parallel side walls 27a, 27b and 28a and 28b of the apertures 27, 28 snugly accommodate at least two sizes of markers, such as dry erase markers. Further, corners of the apertures 31, 32 will accommodate the points of sharper writing instruments such as pens, pencils or finer markers and therefore the compass function of the instrument 10 is not limited to use with wide-tipped markers, such as dry erase markers.

Figure 8:
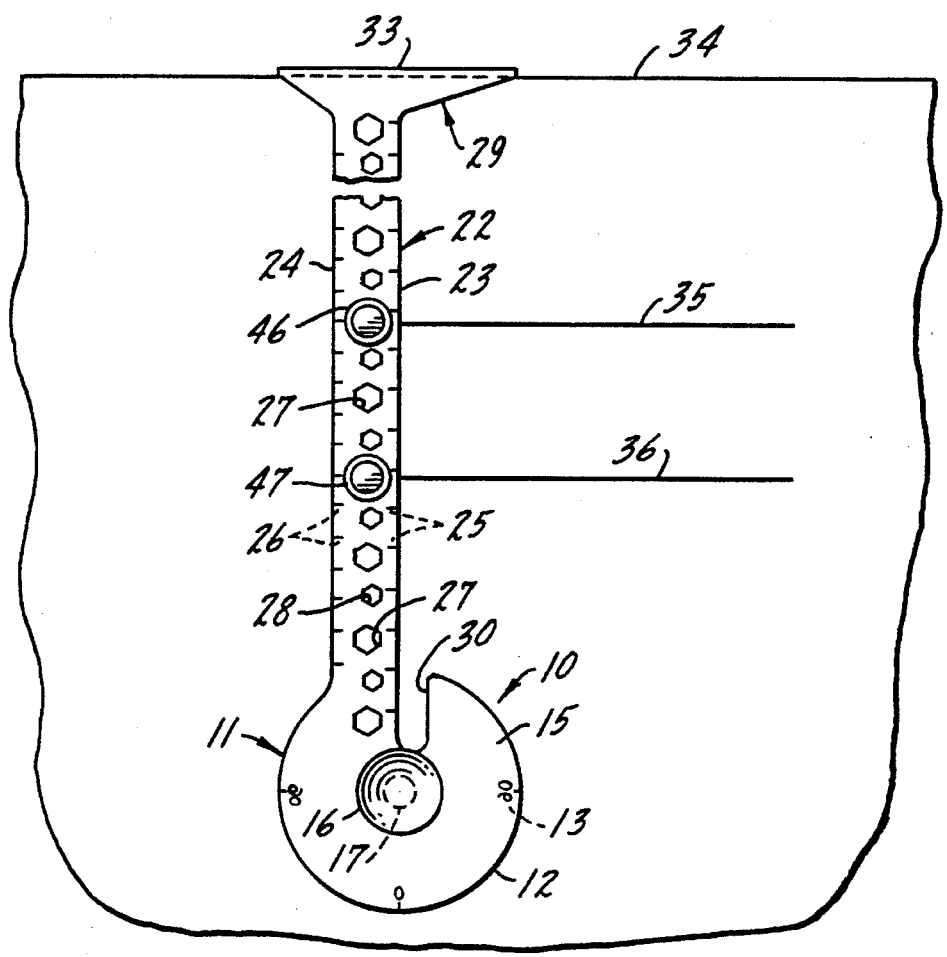
FIG. 8 is a partial top view of the instrument shown in FIG. 1 particularly illustrating the T-square function.

The distal end 29 of the arm 22 includes an outwardly turned lip or ledge 33. As seen in FIG. 8, the ledge 33 is capable of engaging an edge 34 of a board, such as a chalkboard or dry erase board, and thereafter the user may slide the instrument 10 along the edge 34 of the board to draw parallel lines, such as those indicated at 35, 36.

Turning to FIG. 2, the cap 18 of the suction 16 is forcibly inserted through the aperture 17 in the circular plate 11. The width of the aperture 17 is wide enough so as to provide a smooth, pivotal connection between the suction 16 and the instrument 10. Preferably, the connection between the cup 16 and the instrument 10 should not be loose or wobbly but should provide for easy pivotal movement of circular plate 11 around the suction cup 16.

FIG. 3 is a bottom plan view of the instrument 10. It may be preferable to engrave the indicia 13, 25 and 26 in the underside 15 of the circular plate as well as the underside 37 of the arm 22. Because the suction cup 16 elevates the instrument 10 above the drafting table or dry erase board surface, the indicia 13, 25, 26 will not frictionally engage the writing surface and therefore will not tend to wear off. However, if the indicia 13, 25, 26 are disposed on the upper surface 14 of the circular plate 11 and the upper surface 38 of the arm 22, the indicia may tend to wear due to the constant engagement with the user's hands and with writing instruments.

FIG. 4 is a further illustration of the attachment of the suction cup 16 to the circular plate 11. The cap 18 is forced through the aperture 17. The neck 20 fits snugly within the aperture 17 but with enough clearance to provide a smooth, pivotal engagement of the circular plate 11. However, as noted above, the fit should not be so loose as to cause wobbling of the neck 20 within the aperture 17. Such wobbling would cause unsmooth arcs and circles when the instrument 10 is employed as a compass.

Turning to FIG. 5, use of the instrument 10 as a compass is illustrated. The suction cup 16 has been mounted on the surface 39. The user has selected a large aperture 27c as the effective diameter of the arc 42. It will be noted that the right corner 31c will be the actual effective diameter of the arc 42.

Turning to FIGS. 6 and 7, the use of the instrument 10 as a ruler (FIG. 6) and as a protractor (FIGS. 6 and 7) is illustrated. In FIG. 6, the user draws a straight line by using the upper edge 23 of the ruler or arm 22. The slot 30 enables the user to extend the line 43 inward towards the suction cup 16 or center of the circular plate 11. If the user desires to draw an angle upward or downward from the line 43, a dot 44 is placed next to the zero reference indicia. Turning to FIG. 7, the user selects an angle, such as 30 degrees as indicated in FIG. 7, and the instrument 10 is rotated until the 30 degree indicia line up with the dot 44 made previously in FIG. 6. The resulting line 45 will be at a 30-degree angle with respect to the initial line 43.

As previously discussed with respect to FIG. 8, the T-square function is employed by engaging the lip or ledge 33 over an edge 34 of a board. Markers 46, 47 may be inserted in apertures 27 and the entire instrument 10 may be moved in a horizontal direction resulting in two horizonal and parallel lines 35, 36.

Thus, the present invention provides one instrument 10 that functions as a compass, protractor, T-square and ruler. The instrument 20 is especially adaptable for use with dry erase markers on dry erase boards that may also be used on blackboards, drafting tables and further is useful for someone working at a desk.

Although only one embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

We claim:

1. A drafting instrument providing compass, protractor, T-square and ruler functions, the instrument comprising:

a circular plate having an outer surface and a undersurface, the circular plate including a suction cup pivotally attached to the undersurface for removably attaching the instrument to a drawing surface, an outer periphery of the outer surface of the circular plate including a plurality of measurement indicia indicating angles, the outer periphery of the outer surface of the circular plate and the plurality of measurement indicia disposed thereon providing protractor functions, an arm extending outward from the circular plate, the arm terminating at an outwardly turned distal end of the arm, the arm including a plurality of measurement indicia indicating distances, the arm and the plurality of measurement indicia disposed thereon providing ruler functions, the pivotal attachment of the suction cup to the drawing instrument permitting rotation of the circular plate and the arm about an axis defined by a center of the suction cup, the arm including a plurality of apertures for accommodating a writing instrument, the apertures disposed in the arm and the arm and the pivotal attachment of the circular plate to the suction cup providing compass functions, and the outwardly turned distal end of the arm and the arm providing T-square functions when the suction cup is removed from the drawing surface and the outer surface of the circular plate is placed downward on the drawing surface and the outwardly turned distal end of the arm engages an outer edge of the drawing surface.

2. The instrument of claim 1, wherein the apertures disposed in the arm are of a plurality of sizes to accommodate writing instruments of different sizes.

3. The instrument of claim 1, wherein the apertures disposed in the arm are of a plurality of shapes and a plurality of sizes.

4. The instrument of claim 2, wherein the arm includes an upper edge, the circular plate includes a slot extending from a central portion of the circular plate outward to the upper edge of the arm, the slot extending the upper edge of the arm to the central portion of the circular plate.

5. The instrument of claim 4, wherein the arm including a lower edge, the upper and lower edges of the arm each accommodating said plurality of measurement indicia indicating distances.

6. The instrument of claim 5, wherein the indicia disposed on the upper edge is in english units, the indicia disposed on the lower edge is in metric units.

7. A drafting instrument providing compass, protractor, T-square and ruler functions, the instrument comprising:

a circular plate having an outer surface and a undersurface, the circular plate including a suction cup pivotally attached to the undersurface for removably attaching the instrument to a drawing surface, an outer periphery of the outer surface of the circular plate including a plurality of measurement indicia indicating angles, the outer periphery of the outer surface of the circular plate and the plurality of measurement indicia disposed thereon providing protractor functions, an arm extending outward from the circular plate, the arm terminating at an outwardly turned distal end of the arm, the arm including a plurality of measurement indicia indicating distances, the arm and the plurality of measurement indicia disposed thereon providing ruler functions, the pivotal attachment of the suction cup to the drawing instrument permitting rotation of the circular plate and the arm about an axis defined by a center of the suction cup, the arm including a plurality of apertures for accommodating a writing instrument, the apertures disposed in the arm are of a plurality of sizes to accommodate writing instruments of different sizes, the apertures disposed in the arm and the arm and the pivotal attachment of the circular plate to the suction cup providing compass functions, the arm further including an upper edge, the circular plate including a slot extending from a central portion of the circular plate to the upper edge of the arm, the upper edge of the arm and the slot and the measurement indicia disposed on the outer periphery of the circular plate enabling the user to draw straight lines at varying angles, the outwardly turned distal end of the arm and the arm providing T-square functions when the suction cup is removed from the drawing surface and the outer surface of the circular plate is placed downward on the drawing surface and the outwardly turned distal end of the arm engages an outer edge of the drawing surface.

8. The instrument of claim 7, wherein the arm including a lower edge, the upper and lower edges of the arm each accommodating said plurality of measurement indicia indicating distances.

9. The instrument of claim 8, wherein the indicia disposed on the upper edge is in english units, the indicia disposed on the lower edge is in metric units.

10. A drafting instrument providing compass, protractor, T-square and ruler functions, the instrument comprising:

a circular plate, the circular plate being pivotally attached to a means for temporarily securing the instrument to a base surface to provide a reference point for the compass and protractor functions, an outer periphery of the circular plate including a plurality of measurement indicia, the outer periphery the circular plate and the plurality of measurement indicia disposed thereon providing protractor functions, an arm extending outward from the circular plate, a distal end of the arm terminating in an upwardly protruding lip, the arm including a plurality of measurement indicia, the arm and the plurality of measurement indicia disposed thereon providing ruler functions, the arm including means for accommodating a writing instrument, the means for accommodating a writing instrument, the arm and the pivotal attachment of the circular plate to the means for temporarily securing the instrument to a base surface providing compass functions, and the lip and the arm providing T-square functions when the instrument is removed from the base surface and the circular plate is placed downward on the base surface and the lip engages an outer edge of the base surface.

11. A drafting instrument comprising:

a circular plate attached to means for pivotally and removably attaching the instrument to a base surface, an outer periphery of the circular plate including a plurality of measurement indicia indicating angles, the outer periphery of the circular plate and the plurality of measurement indicia disposed thereon providing protractor functions, an arm extending outward from the circular plate, a distal end of the arm terminating in an upwardly protruding ledge, the arm including a plurality of measurement indicia indicating distances, the arm and the plurality of measurement indicia disposed thereon providing ruler functions, the means for pivotally and removably attaching the instrument to a base surface permitting rotation of the circular plate and the arm about an axis defined by a center of the means for pivotally and removably attaching the instrument to a base surface, the arm including a plurality of means for accommodating a writing instrument, the means for accommodating a writing instrument, the arm and the pivotal attachment of the circular plate to the means for pivotally and removably attaching the instrument to a base surface providing compass functions, and the ledge and the arm providing T-square functions when the instrument is removed from the base surface and the circular plate is placed downward on the base surface and the ledge engages an outer edge of the base surface.

12. A drafting instrument comprising:

a circular plate having an upper surface and a undersurface, the undersurface of the circular plate including a means for pivotally and removably attaching the instrument to a base surface, an outer periphery of the circular plate including a plurality of measurement indicia indicating angles, the outer periphery of the circular plate and the plurality of measurement indicia disposed thereon providing protractor functions, an arm extending outward from the circular plate, a distal end of the arm terminating in an upwardly protruding lip, the arm including a plurality of measurement indicia indicating distances, the arm and the plurality of measurement indicia disposed thereon providing ruler functions, the means for pivotally and removably attaching the instrument to a base surface permitting rotation of the circular plate and the arm about an axis defined by a center of the means for pivotally and removably attaching the instrument to a base surface, the arm including a plurality of means for accommodating a writing instrument, the means for accommodating a writing instrument disposed in the arm are of a plurality of sizes to accommodate writing instruments of different sizes, the means for accommodating a writing instrument, the arm and the pivotal attachment of the circular plate to the means for pivotally and removably attaching the instrument to a base surface providing compass functions, the arm further including an upper edge, the circular plate including a slot extending from a central portion of the circular plate to the upper edge of the arm, the upper edge of the arm and the slot and the measurement indicia disposed on the outer periphery of the circular plate enabling the user to draw straight lines at varying angles, the upwardly turned lip and the arm providing T-square functions when the instrument is removed from the base surface and the upper surface of the circular plate is placed downward on the base surface and the upwardly turned lip engages an outer edge of the base surface.

13. In a single, two-part drafting instrument for use on a base surface, the instrument comprising:

a first part comprising means for temporarily securing the instrument to the base surface, the first part pivotally connected to a second part thereby enabling the second part to pivot about the first part, the second part including a circular plate which is pivotally connected to the first part, the circular plate including a plurality of measurement indicia disposed thereon indicating angles, and an arm extends outward from the circular plate and terminates at an upwardly protruding ledge, the arm including a plurality of measurement indicia disposed thereon indicating distances, the arm including a plurality of apertures disposed therein for accommodating a writing instrument, the first part temporarily securing the instrument to the base surface providing a fixed reference for the circular plate and arm to pivot about;

the arm in combination with the apertures disposed therein and the first part providing a compass function;

the circular plate in combination with the measurement indicia disposed thereon and the first part providing a protractor function;

the arm in combination with the upwardly protruding ledge providing a T-square function;

the arm in combination with the measurement indicia disposed thereon providing a ruler function.

* * * * *